June 12, 1951  C. MACBETH ET AL  2,556,624
RESILIENT CLUTCH PLATE
Filed June 3, 1948

Inventors
C. Macbeth
A. Kay, Deceased
By Paul Archer, Legal Representative
By Glascock Downing Seebold attys Patented June 12, 1951

2,556,624

UNITED STATES PATENT OFFICE 2,556,624

RESILIENT CLUTCH PLATE

Colin Macbeth, Birmingham, England, and Arthur Kay, deceased, late of Prestwich, England, by Paul Archer, Deputy Public Trustee of the Public Trustee, Manchester, England, legal representative, assignor to said Macbeth Application June 3, 1948, Serial No. 30,874
In Great Britain January 31, 1947

1 Claim. (Cl. 64—13)

This invention relates to power transmission clutches, and particularly mechanically propelled vehicle clutches, of the kind in which a pair of sheet metal discs are interconnected by a rubber or like torsionally resilient annulus, one of the discs being secured to a hub, and the other having secured to it (directly or indirectly) friction pieces which co-operate with complementary parts of the clutch.

The object of the present invention is to provide an improved construction enabling a positive driving connection to be obtained between the hub and the disc associated with the friction pieces in the event of failure of the rubber or like annulus.

In the accompanying drawings—

Figure 2:
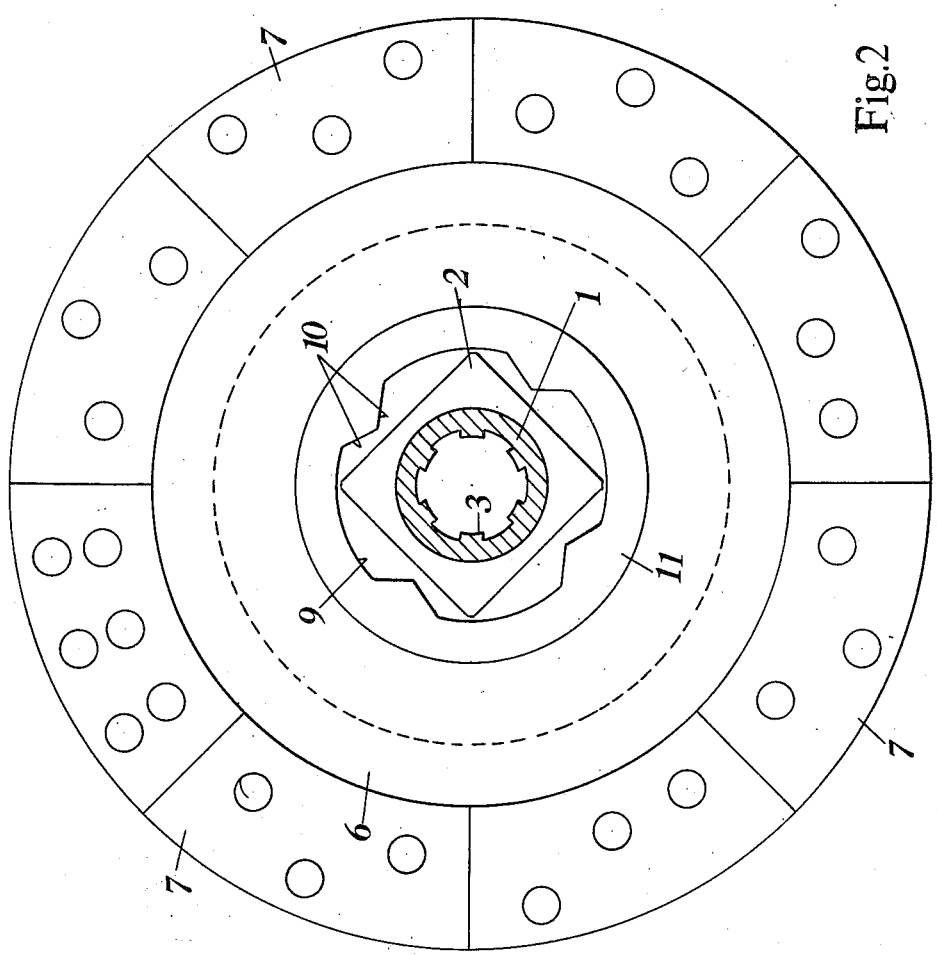
Figure 2 is an end elevation, partly in section, of the clutch.
Figure 1:
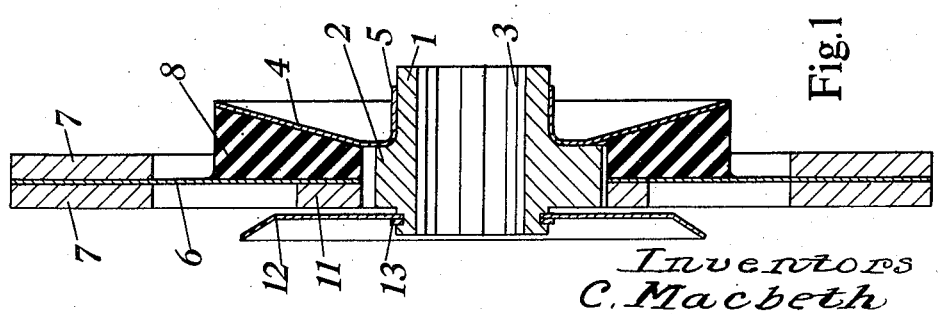
Figure 1 is a sectional elevation of part of a power transmission clutch constructed in accordance with the invention.

In carrying the invention into effect according to one convenient mode as illustrated in the drawings, there is provided a metal hub 1 having a central portion 2 of square cross section. Preferably the hub is made from a length of rolled or bright-drawn steel bar or tube of the desired square cross section. Each end of the hub is turned to a cylindrical form, leaving a portion of the original square section of convenient length between the cylindrical parts. The bore of the hub is provided with splines 3, or is otherwise adapted for effecting connection with the shaft on which it is to be mounted. One of the sheet metal discs 4 to be mounted on the hub has formed around its central portion a flange or boss 5, and this is secured to one of the cylindrical portions of the hub by copper-welding or otherwise. The disc 4 is of shallow truncated conical form, but may be flat or otherwise shaped if desired. The main part of the other disc 6 is flat as shown and is of larger diameter than the disc 4. The outer part of the disc 6 is faced on both sides with frictional material 7 which may take the form of segmental sections. Alternatively the frictional material may be secured to a sheet metal annulus which is attached to the disc in any convenient manner. The two discs 4 and 6 are spaced at a convenient distance apart, and are connected together by an intermediate rubber or like annulus 8 having its side faces bonded to the adjacent faces of the discs.

It will be appreciated that the making of the hub from material of standard section as described above considerably reduces the cost of manufacture thereof.

At the centre of the second disc 6 is formed an aperture of non-circular form. The periphery of this aperture is shaped with four recesses 9 with the surface of which the corners of the square portion 2 of the hub have a small or reasonable clearance. Each recess is bounded by a pair of straight surfaces 10 with which the corners of the square hub 2 may engage when the hub is displaced to the limit allowed by the recesses in the disc 6.

The width of the recess is such as will allow the desired amount of angular freedom between the hub and disc in either direction (for example 45°) and the depth is such as will provide an adequate length of contact between the flat faces of the square portion of the hub and the ends of the recesses. Also to the disc 6 is attached a reinforcing member 11 which may be copper brazed (or riveted) to the disc 6 to afford an adequate area of contact between the flat faces of the hub and the end surfaces 10 of the recesses 9. When the parts are assembled, the recesses and flat surfaces of the hub may be so disposed relatively to each other, that a larger relative angular movement is provided in one direction than in the other direction as seen in Figure 2, and the larger range of movement is such as will allow the required torsional freedom of the rubber or like annulus during the normal action of the clutch.

Adjacent to the outer edge of the flange around the aperture in the second disc there is mounted on the hub a short metal retaining ring 12 which may serve also as an oil flinger, this ring being held in position by any convenient means such as a split ring 13 which is sprung into a circumferential groove in the hub. The purpose of the retaining ring is to ensure that the polygonal hub portion 2 will remain in operative relation with the aperture in the disc 6 upon failure of the annulus.

In the bonding of the discs 4 and 6 to the rubber or like annulus provision may be made whereby a portion of the rubber or the like can extend into and form a thin lining on the interior surfaces of the aperture in the second disc 6. By this arrangement the moulding of the annulus may be facilitated.

If desired the sheet metal disc 4 may be flat at its inner periphery and may be attached to the hub in any suitable manner as by riveting at the corners of the shaped hub body, or the attachment may be by copper brazing or welding the flat portion of the disc to the turned radial face of the hub with or without the aid of rivets.

It is already known in clutches of the type to which the invention relates, to limit the relative angular freedom of the two discs which are interconnected by the torsionally resilient annulus, for enabling a positive connection with the hub to be obtained in the event of failure of the annulus, or for limiting the extent to which the annulus can be distorted by an excessive load. By our invention we are able to provide the means required for achieving this result in a very simple and convenient manner. While the clutch is working normally, the second disc 6 and hub 1 have sufficient relative freedom to enable the rubber or like annulus 8 to operate normally, but in the event of an excessive load being imposed, or of failure of the annulus, the serviceability of the clutch is maintained by the interaction of the polygonal portion 2 of the hub and the ends of the recesses 9 in the disc 6 associated with that portion.

Having thus described our invention what we claim as new and desire to secure by Letters Patent is:

A power transmission clutch of the kind specified, comprising in combination a hub having an external periphery which over a part of its length is of square form in cross section, and over another part of its length is of cylindrical form, an annular disc secured on the hub at one side of the square hub part with the inner periphery of the disc closely fitting the cylindrical hub part, a second disc having at its centre an aperture through which the square hub part extends, the periphery of the aperture being formed with four recesses which respectively accommodate the corners of the square hub part and permit a predetermined amount of relative angular movement between the second disc and hub, and a torsionally resilient annulus having its end faces respectively bonded to the two discs and serving normally to prevent contact of the square hub part with the ends of the recesses in the periphery of the aperture in the second disc, the ends of the said recesses being formed by straight surfaces for co-operating with the adjacent surfaces of the square hub part to limit the relative angular movement between the second disc and hub in the event of an excessive torsional strain being imposed on the annulus.

COLIN MACBETH,
PAUL ARCHER,
*Deputy Public Trustee of the Public Trustee, Legal Representative of the Estate of Arthur Kay, Deceased.*

REFERENCES CITED

The following references are of record in the file of this patent:

UNITED STATES PATENTS

| Number | Name | Date |
| --- | --- | --- |
| 1,674,225 | Reed | June 19, 1928 |
| 1,804,878 | Jones | May 12, 1931 |
| 2,046,208 | Paulsen et al. | June 30, 1936 |
| 2,234,443 | Macbeth | Mar. 11, 1941 |
| 2,327,389 | Bagnall | Aug. 24, 1943 |